United States Patent
Al Ghatta et al.

(10) Patent No.: US 6,306,921 B1
(45) Date of Patent: Oct. 23, 2001

(54) FOAMED BEADS OF POLYESTER RESIN

(75) Inventors: Hussein Al Ghatta, Fiuggi; Tonino Severini; Luigi Pulcini, both of Colleferro, all of (IT)

(73) Assignee: Sinco Ricerche S.p.A., Verbania Pallanza (IT)

( * ) Notice: Subject to any disclaimer, the term of this patent is extended or adjusted under 35 U.S.C. 154(b) by 0 days.

(21) Appl. No.: 09/702,791

(22) Filed: Nov. 1, 2000

(30) Foreign Application Priority Data

Nov. 9, 1999 (IT) .................................. MI99A2337

(51) Int. Cl.⁷ ....................................... C08J 9/232
(52) U.S. Cl. .......................... 521/182; 264/126; 264/127; 521/138
(58) Field of Search ..................... 521/138, 182; 264/126, 127

(56) References Cited

U.S. PATENT DOCUMENTS

| | | | | |
|---|---|---|---|---|
| 5,399,595 | * | 3/1995 | Sublett et al. | 521/182 |
| 5,482,971 | * | 1/1996 | McConnell | 521/138 |
| 5,519,066 | * | 5/1996 | McConnell | 521/138 |
| 5,661,193 | * | 8/1997 | Khemani | 521/138 |
| 5,922,782 | * | 7/1999 | Khemani | 521/182 |
| 6,020,393 | * | 2/2000 | Khemani | 521/182 |
| 6,025,405 | * | 2/2000 | Tung et al. | 521/182 |
| 6,100,307 | * | 8/2000 | Tung et al. | 521/138 |
| 6,214,897 | * | 4/2001 | Tung et al. | 521/138 |

* cited by examiner

*Primary Examiner*—Morton Foelak
(74) *Attorney, Agent, or Firm*—Guido Modiano; Albert Josif; Daniel O'Byrne

(57) ABSTRACT

Foamed beads of polyester resin having rheological and crystallizability characteristics suitable for the preparation of foamed articles by sintering beads in a mold heated with superheated steam or with inert gas or air.

11 Claims, No Drawings

FOAMED BEADS OF POLYESTER RESIN

FIELD OF THE INVENTION

The present invention relates to foamed beads of polyester resin, to their method of preparation and to their use as loose fillers or for preparing molded foamed articles.

BACKGROUND ART

Foamed beads of various polymers, such as polystyrene, polyethylene and polypropylene, and their use to prepare foamed articles, are known.

It is known that foamed beads and articles obtained from polypropylene have far higher characteristics of chemical inertness, heat-resistance, resilience and impact-resistance than foamed polystyrene.

In the case of polypropylene, however, the process for preparing the beads is either complicated or requires the use of a polymer which is modified by linking side chains in order to improve its melt strength.

In the case of polyester resins, particularly polyethylene terephthalate (PET), the possibility to obtain foamed beads requires the use of resins which have appropriate rheological characteristics in order to be able to foam the particles.

The resins furthermore have relatively high melting temperatures and an equally high crystallinity under the temperature conditions in which it is necessary to work in order to allow the sintering of the beads.

This makes it troublesome to use pre-foamed beads of polyester resin in preparing molded foamed articles.

The production of foamed materials having a complex geometric shape and/or a considerable thickness directly by extrusion-foaming of the polyester resin is difficult to perform.

The need is therefore felt to have foamed beads of polyester resin which can be sinterized easily and effectively in order to be able to prepare said foamed articles.

BRIEF DESCRIPTION OF THE INVENTION

It has now been found unexpectedly that it is possible to obtain foamed beads of aromatic polyester resin which have mechanical and morphologic properties which make them usable not only as loose fillers in applications such as packaging and heat insulation, but also for preparing molded foamed articles having any geometric shape.

DETAILED DESCRIPTION OF THE INVENTION

The beads according to the invention are obtained from aromatic polyester resins having a melt strength of 1 cN at 280° C., a melt viscosity of more than 1500 Pa.s at 280° C. and with shear rate tending to zero, a die-swell index of more than 150%, an intrinsic viscosity of more than 0.8 dl/g and a crystallization rate by heating at 120° C. for 5 minutes such that the resulting crystallinity is not higher than 15%.

The above characteristics are necessary in order to obtain beads which can be easily sinterized without the premature crystallization of the resin on the surface preventing the mutual adhesion of the beads and/or without the beads collapsing when they are subjected to hot compression in the mold used to form the foamed article.

Resins having the above indicated characteristics can be obtained, by way of example and preferably, from copolyethylene terephthalates containing 2 to 20% of isophthalic acid units, by solid-state regrading of the polymer having an intrinsic viscosity generally below 0.7 dl/g in the presence of a dianhydride of a tetracarboxylic acid, preferably pyromellitic dianhydride (PMDA).

Temperature, treatment duration and dianhydride concentration are chosen so as to achieve the intended increase in intrinsic viscosity and in the rheological characteristics of the starting resin.

The regrading temperatures are generally between 150 and 210° C., according to the content of isophthalic acid units present in the resin.

In addition to copolyethylene terephthalates isophthalates, it is possible to use any other aromatic polyester resin which has the above specified rheological and crystallizability characteristics.

For example, it is possible to use polyester resins modified according to known methods with branching agents such as pentaerythritol and mellitic anhydride, added during the molten-state polycondensation of the resin.

It is also possible, again starting from resins that have the above specified crystallizability characteristics, to obtain the required rheological properties directly during extrusion foaming by working in the presence of PMDA and under appropriate extrusion-foaming conditions.

The preparation of the spheroidal foamed beads according to the invention is performed by cutting the foamed threads, by means of rotating blades at the output of an extrusion head with multiple holes, to a length which is a function of the die-swell of the resin.

It is also possible to obtain, by using extrusion heads which have holes of appropriate geometric shape and according to the end-applications, foamed beads which are non-spheroidal, such as C-shaped, T-shaped, L-shaped beads or other letter-like shapes.

The diameter of the spheroidal beads is generally between 1 and 15 mm or more.

The non-spheroidal shapes can have even larger dimensions.

The apparent density of the beads in their various shapes can vary within wide limits according to the conditions used in the extrusion-foaming process and particularly according to the amount of foaming agent used.

Densities between 30 and 500 $kg/m^3$ and preferably between 50 and 200 $kgm^3$ are representative.

The foaming agent is generally an inert gas, such as nitrogen and carbon dioxide, or a hydrocarbon, such as butane or isobutane and mixtures thereof The amount used is conveniently between 1 and 10% by weight on the resin.

Nucleating agents, such as for example talc and similar compounds, can be used in order to control the microstructure of the cells.

The beads, directly after being cut, are propelled away by the rotating blades due to the centrifugal force they apply and are collected in a cooling bath of water kept at relatively low temperatures (10–15° C.).

Rapid cooling of the beads allows to maintain surface crystallinity at relatively low values.

The crystallinity of the beads is generally lower than 10%.

The resulting beads have the characteristics of a fine and uniform microcellular structure (cell size between 50 and 500 microns) in the outermost layer and a macrocellular structure, with cell sizes of a few millimeters, in the central part.

The macrocellular structure disappears when the beads, during sintering, are subjected to compression in the mold for forming the foamed articles.

The outermost microcellular structure remains practically unchanged.

Sintering of the beads is performed in a mold provided with holes for the passage of steam or other heating gas.

Superheated steam at a temperature between approximately 130 and 180° C., or air or an inert gas likewise heated to this temperature range, is used.

The residence times vary from a few seconds to a few minutes.

When using the beads according to the invention, it is not necessary to use pressurized steam to achieve adhesion between said beads.

The beads mutually sinter stably without forming undesired voids between them.

The resulting foamed articles have good resistance to compression and good elastic recovery; their density is slightly higher than the bulk density of the pre-foamed beads.

Density is generally between 50 and 600 g/dm$^3$.

Crystallinity is high, generally between 20 and 40%.

The foamed articles, by virtue of their high mechanical and heat-resistance properties, are advantageously applied in sectors in which said properties are required, and particularly in the field of thermal and acoustic insulation, as structural elements, as barriers for acoustic insulation on highways, as simulated wood decorative elements, as dishes and trays to be subjected to microwave heating, as floating elements, et cetera.

The following examples are given to illustrate but not to limit the scope of the invention.

Measurement Methods

Intrinsic viscosity was measured in a 60/40 solution by weight of phenol and tetrachloroethane at 25° C. according to ASTM D 4603–96.

Rheological measurements were made according to the ASTM D 3835 standard, using a Goettfert rheometer at the temperature of 280° C.

Melt strength was determined by measuring the force in cN (centinewtons) required to stretch the material extruded from the capillary of a Goettfert Rheograph 2002 rheometer.

For measurement, a Rheotens unit was applied at the outlet of the capillary of a Goettfert Rheograph 2002 rheometer.

Extrusion conditions were as follows:

plunger speed: 0.2 mm/sec die diameter: 2 mm capillary length: 30 mm test temperature: 280° C.

Measurements were performed by setting an acceleration of 2.4 cm/sec$^2$.

Each measurement was repeated and the average of the two measurements was taken.

The crystallinity percentage was determined by horizontal ATR (Attenuated Total Reflectance) from the ratio between trans and gauche configuration of the polyethylene terephthalate, which can be correlated to the crystallinity percentage (the amorphous phase can be correlated to the gauche configuration, while the crystalline phase can be correlated to the trans configuration).

The ATR instrument was connected to a Perkin model 2000 FT-IR unit and the measurements were made with a resolution of 8 cm$^{-1}$, accumulating 16 measurements to allow better definition.

The instrument was calibrated against a sample of PET whose crystallinity had been determined with the conventional column density method.

The correlation coefficient was higher than 0.98.

Absorption at 1410 cm$^{-1}$ was used as reference band.

The measurement of the die-swell index was performed by cooling in cold water the molten polymer that exited from a capillary with a shear rate of 1000s$^{-1}$.

The diameter of the thread was compared with the diameter of the capillary. The ratio is the die-swell index.

EXAMPLE 1

90 kg/h of polyethylene terephthalate copolymer, containing 2% of isophthalic acid units, with a melt strength of 150 centinewtons at 280° C., a melt viscosity of 1800 PAS at 300° C. determined with a shear rate of 10 rad/sec and an intrinsic viscosity of 1.25 dl/g (obtained by regrading, at 210° C. and in the presence of 0.4% pyromellitic anhydride, of a copolymer having an IV of 0.63 dl/g) were fed continuously, after drying, to a co-rotating twin-screw extruder having a screw diameter of 90 mm.

Downstream of the screws there was a static mixer for improving the homogenization of the various components.

The temperatures set on the extruder were 280° C. in the melting section, 280° in the compression section, 270° C. in the mixing section, and 265° C. at the extrusion head.

The screw turned at 30 rpm.

4% of n-pentane (foaming agent) was added to the CO-PET in the section of the extruder located after the melting of the polymer and thoroughly mixed with the polymeric matrix.

The composition, once mixed, was extruded through a vertical head having 24 holes arranged along the circumference of said head and having a diameter of 0.1 mm.

The mixture of molten polymer containing the foaming agent was forced through the holes of the die at a pressure of approximately 110 bar and cut by 2 blades rotating at high speed.

Typically, the blades were arranged so as to touch the flat portion of the die.

After the beads had been cut, they were propelled away by the blades by centrifugal force into a cooling liquid (water at 15° C.).

The beads, once cooled, were dried and bagged.

The resulting beads had the following characteristics:

| | |
|---|---|
| bulk density: | 80 kg/m$^3$ |
| spheroidal shape: | 1.4 × 1.8 mm |
| cell structure: | closed cells with a diameter varying between 100 and 300 microns |
| degree of crystallinity: | 7% |

EXAMPLE 2

The preparation of example 1 was repeated, the only difference being that 6% by weight with respect to the polymer of a 70/30 mixture by weight of butane/isobutane (foaming agent) was used, and that the extruded beads were cooled in water at 10° C.

The resulting beads had the following characteristics:

| | |
|---|---|
| bulk density: | 38 kg/m³ |
| spheroidal shape: | 1.6 × 2 mm |
| cell structure: | closed cells with a diameter varying between 80 and 235 microns |
| degree of crystallinity: | 5% |

EXAMPLE 3

20 g of beads of example 1, after 24 hours of conditioning and stabilization at ambient temperature, were introduced in a mold measuring 70×70×70 with walls having 0.5-mm holes for the inflow of steam.

The beads were heated with steam at 150° C. for 5 minutes.

The formed article had the following characteristics:

| | |
|---|---|
| adhesion among the beads: | high (uniform sintering among the beads) |
| cell structure: | closed |
| article density: | 80 g/dm³ |
| crystallinity: | 23% |
| compression strength: | 10% deformation in a cylinder of 20 mm × 100 mm, by applying 0.3 MPa |

EXAMPLE 4

13 g of beads as in example 2 were introduced in the mold used in example 3, and heated with steam at 170° C. for 2 minutes.

The formed article had the following characteristics:

| | |
|---|---|
| adhesion among the beads: | high (uniform sintering among the beads) |
| cell structure: | closed |
| article density: | 40 g/dm³ |
| crystallinity: | 28% |
| compression strength: | 10% deformation with 0.2 MPa (in cylinder as in example 3) |

EXAMPLE 5

17 g of beads produced as in example 2 were introduced in the mold of example 3 and heated with steam at 180° C. for 40 seconds.

The resulting article had the following characteristics:

| | |
|---|---|
| adhesion among the beads: | high |
| cell structure: | closed |
| article density: | 32 g/dm³ |
| crystallinity: | 30% |
| compression strength: | 10% deformation with 0.19 MPa (in cylinder as in example 3) |

Similar results were achieved by heating the beads with nitrogen instead of steam.

The disclosures in Italian Patent Application No. MI99A002337 from which this application claims priority are incorporated herein by reference.

What is claimed is:

1. Foamed beads of aromatic polyester resin, having a density between 30 and 500 kg/m³, wherein the resin that constitutes the particles has a melt strength of more than 1 cN at 280° C., a melt viscosity of more than 1500 Pa.s at 280° C. with shear rate tending to zero, a die swell index of more than 150% and a crystallization rate such that by heating at 120° C. for 5 minutes crystallinity does not exceed 15%.

2. The beads according to claim 1, having a spheroidal shape with a diameter of 1 to 15 mm.

3. The beads according to claim 2, wherein the central part of the particles is formed by one or more macrocells, while the outermost layer has a microcellular structure with a cell size of 50 to 500 microns.

4. The beads according to claim 1, wherein the crystallinity of the particles is lower than 10%.

5. The beads according to claim 1, wherein the polyester resin is a copolyethylene terephthalate isophthalate containing 2 to 20% of units derived from isophthalic acid.

6. The beads according to claim 5, wherein the copolyethylene terephthalate is obtained by solid-state polycondensation in the presence of pyromellitic anhydride.

7. A method for preparing the foamed beads according to claim 1 by extrusion foaming a resin which has the characteristics indicated in claim 1 and by subsequent cutting of the threads of the resin as they exit from the extruder, wherein the threads are cut by rotating blades which skim the head of the die and propel the beads by centrifugal force into a cooling bath with water kept at temperatures below 20° C.

8. Foamed articles obtained by sintering in a mold foamed beads having the properties specified in claim 1.

9. The articles according to claim 8, wherein the sintering is achieved by heating with superheated steam or with air or inert gas heated to a temperature between 130 and 180° C.

10. Foamed articles made of aromatic polyester resin having a density of 50 to 600 kg/m³, formed by sintering foamed particles, wherein the polyester resin has the characteristics set forth in claim 1.

11. The foamed articles according to claim 8, having a crystallinity of 20 to 40%.

* * * * *